(12) United States Patent
Garcia Martinez et al.

(10) Patent No.: US 11,343,882 B2
(45) Date of Patent: May 24, 2022

(54) COOKING UTENSIL HAVING CONTACTLESS DRIVEN CONSUMER WITH A DRIVING UNIT OF THE CONSUMER OPERATING BASED ON DIRECT OPTICAL DETECTION OF THE CONSUMERS MOVEMENT

(71) Applicant: BSH Hausgeräte GmbH, Munich (DE)

(72) Inventors: Jose Andres Garcia Martinez, Saragossa (ES); Sergio Llorente Gil, Saragossa (ES); Teresa Del Carmen Marzo Alvarez, Saragossa (ES); Jorge Mir Bel, Saragossa (ES); Julio Rivera Peman, Cuarte de Huerva (ES); Francisco Javier Sancho Diaz, Saragossa (ES); Beatriz Villanueva Valero, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 454 days.

(21) Appl. No.: 15/571,507

(22) PCT Filed: Apr. 27, 2016

(86) PCT No.: PCT/IB2016/052368
§ 371 (c)(1),
(2) Date: Nov. 3, 2017

(87) PCT Pub. No.: WO2016/185305
PCT Pub. Date: Nov. 24, 2016

(65) Prior Publication Data
US 2018/0146516 A1 May 24, 2018

(30) Foreign Application Priority Data
May 21, 2015 (ES) ............................... ES201530699

(51) Int. Cl.
*H05B 6/12* (2006.01)
*H05B 6/06* (2006.01)

(52) U.S. Cl.
CPC ........... *H05B 6/1236* (2013.01); *H05B 6/062* (2013.01); *H05B 6/1209* (2013.01);
(Continued)

(58) Field of Classification Search
CPC .................................................. A47J 43/0465
See application file for complete search history.

(56) References Cited

U.S. PATENT DOCUMENTS

| 4,038,518 A | 7/1977 | Morton et al. |
| 5,408,075 A | 4/1995 | De Matteis et al. |

(Continued)

FOREIGN PATENT DOCUMENTS

| CN | 101627660 A | 1/2010 |
| EP | 2548636 A1 | 1/2013 |

(Continued)

OTHER PUBLICATIONS

International Search Report PCT/IB2016/052368 dated Jul. 20, 2016.
(Continued)

*Primary Examiner* — Ibrahime A Abraham
*Assistant Examiner* — Spencer H. Kirkwood
(74) *Attorney, Agent, or Firm* — Michael E. Tschupp; Andre Pallapies; Brandon G. Braun

(57) ABSTRACT

A cooking utensil includes a drive unit which is configured to drive at least one consumer, and a receiving unit which is configured to receive energy in a contactless manner and to supply energy to the drive unit. The cooking utensil can be part of a cooking system which further includes a cooktop apparatus having an induction unit configured at least to supply energy for the receiving unit of the cooking utensil.

22 Claims, 4 Drawing Sheets

(52) U.S. Cl.
CPC ...... *H05B 2213/03* (2013.01); *H05B 2213/06* (2013.01); *Y02B 40/00* (2013.01)

(56) References Cited

U.S. PATENT DOCUMENTS

| | | | | |
|---|---|---|---|---|
| 5,549,382 | A | * | 8/1996 | Correia, II .......... B01F 13/0818 366/144 |
| 5,808,280 | A | * | 9/1998 | Gaspard ................ H05B 6/065 219/624 |
| 2006/0221765 | A1 | | 10/2006 | Andersson |
| 2009/0251113 | A1 | | 10/2009 | Raghuprasad |
| 2013/0168385 | A1 | | 7/2013 | Alet Vidal et al. |
| 2014/0203010 | A1 | | 7/2014 | Alet Vidal et al. |
| 2015/0190015 | A1 | * | 7/2015 | Ven Der Woning .. A47J 27/004 366/143 |
| 2015/0237682 | A1 | * | 8/2015 | Yaman ................ A47J 27/002 219/624 |
| 2016/0235251 | A1 | * | 8/2016 | Carella ..................... A23L 5/15 |
| 2016/0374501 | A1 | * | 12/2016 | Logan .................. A47J 27/002 426/231 |

FOREIGN PATENT DOCUMENTS

| | | | | |
|---|---|---|---|---|
| EP | 2757660 | A1 | | 7/2014 |
| EP | 2886026 | A1 * | 6/2015 | ............ A47J 27/004 |
| WO | 2014056785 | A1 | | 4/2014 |

OTHER PUBLICATIONS

National Search Report ES P201530699 dated Feb. 9, 2016.
National Search Report CN 201680029467.0 dated Dec. 25, 2019.

* cited by examiner

COOKING UTENSIL HAVING CONTACTLESS DRIVEN CONSUMER WITH A DRIVING UNIT OF THE CONSUMER OPERATING BASED ON DIRECT OPTICAL DETECTION OF THE CONSUMERS MOVEMENT

CROSS-REFERENCES TO RELATED APPLICATIONS

This application is the U.S. National Stage of International Application No. PCT/IB2016/052368, filed Apr. 27, 2016, which designated the United States and has been published as International Publication No. WO 2016/185305 A1 and which claims the priority of Spanish Patent Application, Serial No. P201530699, filed May 21, 2015, pursuant to 35 U.S.C. 119(a)-(d).

BACKGROUND OF THE INVENTION

The invention relates to a cooking utensil and a cooking system.

A cooking utensil, which is provided to be positioned on a cooktop plate of a cooktop apparatus to perform a heating operation, is already known from the prior art. During the heating operation the cooking utensil is heated by induction heating elements. The induction heating elements are arranged below a cooktop plate of the cooktop apparatus and are provided to heat the cooking utensil. A consumer arranged above the cooktop plate must be driven by means of a separate drive unit and/or manually.

BRIEF SUMMARY OF THE INVENTION

It is the object of the invention in particular to provide a generic cooking utensil with improved properties in respect of a high level of convenience.

A cooking utensil is proposed, with a drive unit, which is provided to drive at least one consumer, and with a receiving unit, which is provided to receive energy, in particular electromagnetic energy, in a contactless manner and to supply energy to the drive unit. A "cooking utensil" refers in particular to a unit which is provided in particular to hold at least one food in at least one operating state and in particular to be in direct contact with the food in at least one operating state. The food could be for example a food to be cooked, in particular an item to be cooked and/or a food to be processed in particular mechanically, advantageously in a manner that goes beyond heating. The cooking utensil is provided in particular to be positioned on a cooktop plate to perform a heating operation. A cooktop apparatus of a cooking system having the cooking utensil in particular has at least one induction heating element, which is provided in particular to provide and/or supply the cooking utensil at least with energy, in particular in the form of an electromagnetic alternating field, so that it can perform the heating operation. A "cooktop plate" refers in particular to a unit, which is provided for the positioning of cooking utensils thereon in at least one operating state and which is provided in particular to form a part of a cooktop exterior housing, in particular of a cooktop apparatus and/or a cooktop having a cooktop apparatus. The cooktop plate is made in particular at least largely of glass and/or ceramic glass. "At least largely" refers in particular to a percentage of at least 70%, in particular at least 80%, advantageously at least 90% and preferably at least 95%. The drive unit is provided in particular to supply at least drive energy to the consumer in at least one operating state, the drive unit generating, in particular acquiring and/or diverting and/or making available said drive energy from the energy received by the receiving unit. A "consumer" refers in particular to a structural unit, which is distinguished in particular from a pure liquid and which is provided in particular to be made to be move at least partially by the drive unit. The receiving unit is provided in particular to receive electromagnetic energy, advantageously supplied by at least one induction unit, in at least one operating state. The receiving unit is preferably provided to supply the drive unit at least partially, in particular at least largely and advantageously completely by means of the received energy. The receiving unit could be provided for example to transfer energy inductively and/or to transfer energy capacitively and/or to transfer energy electromagnetically and/or to transfer energy by laser and/or to transfer energy by sound. "Provided" means in particular specifically programmed, designed and/or equipped. That an object is provided for a specific function means in particular that the object satisfies and/or performs said specific function in at least one application and/or operating state.

The inventive configuration in particular allows a high level of convenience to be achieved. In particular it allows a high level of flexibility in respect of positioning the cooking utensil thereon and/or in respect of a type of energy transferred. The drive unit can in particular supply a plurality of different consumers.

It is further proposed that the receiving unit has at least one inductor. In particular the receiving unit has at least one coil, which is provided in particular to be magnetized and/or to generate at least one induction current as a function of at least one magnetic field, in particular an electromagnetic alternating field, supplied by at least one induction unit. The receiving unit could have in particular at least two, advantageously at least three, particularly advantageously at least five and preferably a number of inductors. This in particular allows an economical configuration. In particular a large quantity of power can be transferred.

It is also proposed that the drive unit is provided to supply at least one magnetic field to drive the consumer. In particular the drive unit is provided to convert the energy supplied by the receiving unit at least largely to electromagnetic energy. For example the drive unit could be provided in particular to supply the electromagnetic energy directly to the consumer and in particular to drive the consumer by means of the electromagnetic energy, for example by means of a magnetic field. Alternatively the drive unit could be provided to convert the electromagnetic energy to a further energy form, for example mechanical energy, and in particular to supply the further energy form to the consumer and advantageously to drive the consumer by means of the further energy form. This allows the consumer to be driven particularly advantageously. In particular a high level of efficiency can be achieved.

It is also proposed that the drive unit has at least one electric motor, which is provided to drive the consumer. The drive unit has in particular at least one shaft. The shaft is then preferably provided to connect the electric motor and the consumer at least substantially to one another in at least one assembled state. The drive unit is preferably provided to drive the consumer by means of the electric motor by way of the shaft, said shaft engaging in particular through an interior housing part of a cooking utensil housing unit facing a food chamber. In an alternative exemplary embodiment the drive unit could in particular have at least one permanent magnet, which could be connected to the electric motor by the shaft in at least one operating state. The permanent magnet could be provided in particular to supply and/or generate the magnetic field supplied by the drive unit. In particular the drive unit could be provided to drive the consumer by means of the magnetic field supplied by the permanent magnet. In particular the permanent magnet could be provided to interact with at least one magnetic element of the consumer in at least one operating state and advantageously to supply said magnetic element with the magnetic field to drive it. In a further alternative exemplary embodiment the drive unit could have in particular at least two electromagnets, which could be provided in particular to supply the magnetic field to drive the consumer. An "electric motor" refers in particular to a structural unit, which is provided to convert electrical energy to kinetic energy. The drive unit is advantageously provided to supply the electromagnetic energy in particular within the electric motor and advantageously to convert it at least largely to kinetic energy and to transfer said kinetic energy advantageously to the consumer. The drive unit is provided in particular to cause the consumer to move and/or to keep it moving. In particular the movement is configured as a rotational movement rotating at least substantially about a rotation axis. This in particular allows standard components to be used, in particular keeping costs low. In particular a high level of reliability can be achieved.

In a further configuration it is proposed that the drive unit is provided to supply a magnetic field that rotates at least substantially about at least one rotation axis and engages at least partially in a food chamber to drive the consumer. The food chamber is provided in particular to hold at least one food. A magnetic field "that rotates at least substantially about at least one rotation axis" refers in particular to a magnetic field, the polarity of which moves about the rotation axis in particular on average over time.

For example the magnetic field could rotate at least substantially continuously about the rotation axis. The magnetic field could in particular rotate in a stepped manner, in particular in small, for example discrete, stages, about the rotation axis. A magnetic field "that engages at least partially in a food chamber" refers in particular to a magnetic field, the field lines of which engage at least partially in the food chamber and in particular can be measured therein, it being possible for a further part of the field lines to be arranged outside the food chamber. This allows the consumer to be driven particularly advantageously.

It is also proposed that the cooking utensil has at least the consumer which is configured as a food processing unit. A "food processing unit" refers in particular to a unit which is provided to process at least one food, which is arranged in particular in the food chamber, in particular in a manner that goes beyond simple heating, in at least one operating state, and which has in particular at least one processing tool, which is provided to be in direct contact with the food in at least one operating state. The processing tool is provided in particular to process, in particular to mix and/or to whisk and/or to grind and/or to chop and/or to blend and/or to emulsify and/or to knead and/or to cut up at least one food arranged in the food chamber in at least one operating state. The processing tool is provided in particular to cause at least one food arranged in the food chamber to move in particular from at least one non-moving state and/or to keep it moving in particular from a moving state in at least one operating state. In at least one operating state of the food processing unit in particular at least a part of the food processing unit, in particular the processing tool, is provided to be in direct contact with the food. The food processing unit is provided in particular to process different types and/or consistencies of food, for example dough and/or liquid and/or at least partially fluid materials and/or sauces and/or at least partially solid foods. In particular the food processing unit has at least two, in particular at least three, advantageously at least five and preferably at least seven different processing tools. This allows in particular a high level of convenience to be achieved. In particular it allows a high level of energy efficiency, in particular due to movement of an at least partially fluid food to be cooked. User-friendly and/or easy operation in particular can be achieved, it being possible in particular to monitor and/or influence cooking parameters in particular in a simple manner. A high level of flexibility in particular can be achieved. In particular it minimizes the likelihood of burning and/or reduces soaking time, in particular improving the wear resistance and/or useful life of a cooking utensil, within which the food processing unit is arranged. By moving an at least partially fluid food to be cooked, it is possible in particular to achieve reproducible cooking results and/or a low level of inhomogeneity in a food to be cooked.

It is further proposed that the consumer has at least one magnetic element, which is provided to interact with the magnetic field. In particular the magnetic element is provided to absorb the magnetic field and to execute a rotational movement about the rotation axis in particular as a function of the magnetic field. For example the magnetic element could be a permanent magnet and/or an electromagnet and/or an inductor. The magnetic element could be configured for example as a single piece with the processing tool, which could in particular have at least one magnet and be provided to receive the magnetic field generated by the drive unit. Alternatively the magnetic element and processing tool could be configured as separate elements and be connected in particular mechanically to one another in particular in at least one assembled state. This avoids the need in particular for a recess in an interior housing part delimiting the food chamber and/or allows easy cleaning.

For example the cooking utensil could have at least one electronics unit, which is configured in particular separately from a cooktop control unit and could advantageously be provided to activate and/or operate the drive unit independently of control commands from a cooktop control unit. The electronics unit could be provided for example to activate and/or operate the drive unit as a function of an operating input by means of an operating unit of the cooking utensil. Alternatively the cooking utensil could have an electronics unit which has at least one filter and could be provided in particular to filter out at least high-frequency signals. A cooktop control unit could be provided in particular to activate and/or operate the drive unit as a function of an operating input by means of a cooktop operating unit. The cooking utensil preferably has at least one electronics unit, which is provided to receive control commands from a cooktop control unit. The electronics unit is provided in particular to activate and/or operate the drive unit as a function of at least one control command from the cooktop control unit. In particular the cooktop control unit and the electronics unit could communicate with one another by means of Bluetooth and/or by means of infrared and/or by means of a local radio network. An "electronics unit" refers in particular to an electronic unit which has a computation unit and in particular a storage unit in addition to the computation unit, with an operating program stored therein, which is provided to be executed by the computation unit. A "cooktop control unit" refers in particular to an electronic unit, which is preferably integrated at least partially in a control and/or regulating unit of a cooktop and which is preferably provided to control and/or regulate at least one electronic supply unit, which is provided in particular to supply at least one induction unit and/or at least one induction heating element. The cooktop control unit preferably comprises a computation unit and in particular a storage unit in addition to the computation unit, with a control and/or regulating program stored therein, which is provided to be executed by the computation unit. The cooktop control unit could be provided for example to transmit control commands by means of autonomous signals and/or by means of modulated signals. This in particular allows a high level of operating convenience to be achieved as in particular control of at least one operating parameter of the consumer can be effected by way of a cooktop operating unit of a cooktop apparatus, which is in particular part of a cooktop and/or cooktop system. It also advantageously minimizes the complexity of the electronics unit.

The cooking utensil preferably has at least one cooking utensil housing unit, within which at least the receiving unit and in particular also the drive unit is/are arranged in at least one assembled state. The cooking utensil housing unit defines the food chamber in particular. The cooking utensil housing unit in particular has at least one interior housing part, which is arranged in particular facing the food chamber and advantageously at least substantially delimits the food chamber. In particular the cooking utensil housing unit has at least one exterior housing part, which is arranged in particular facing away from the food chamber and advantageously defines an exterior appearance of the cooking utensil housing unit and in particular of the cooking utensil, in particular as visible to an operator in an operating state. The exterior housing part and the interior housing part are connected in particular mechanically to one another and delimit in particular at least one intermediate space in at least one assembled state. In the operating state the receiving unit is enclosed in particular by the cooking utensil housing unit. In particular the receiving unit is arranged at least largely between the exterior housing part and the interior housing part, in particular in the intermediate space, in the operating state. In the operating state the receiving unit is integrated in particular in the cooking utensil, advantageously in the cooking utensil housing unit. This allows in particular a protected arrangement of the receiving unit to be achieved. In particular a high level of stability can be attained.

It is further proposed that the cooking utensil housing unit has at least one exterior housing part facing away from the food chamber and at least one interior housing part facing the food chamber, these being made of materials with different magnetic properties. In particular the interior housing part is made at least largely of a metal, in particular a magnetic metal, advantageously a ferromagnetic metal. The interior housing part could be made for example at least largely of iron and/or ferromagnetic steel. In particular the exterior housing part is made at least largely of a non-metal. The exterior housing part could be made for example at least largely of plastic and/or ceramic. This in particular restricts heating to regions provided for the purpose and advantageously allows a transfer of energy at least substantially at the same time in further regions provided for the purpose. In particular this allows a high level of flexibility to be achieved in respect of configuration options.

It is further proposed that the exterior housing part and the interior housing part define at least one intermediate space, which is at least largely filled with an insulating material. The cooking utensil housing unit in particular has at least the insulating material, which is arranged between the exterior housing part and the interior housing part in at least one assembled state. In particular the insulating material is made at least largely of a material with a low thermal conductivity. The insulating material could be made for example at least largely of plastic and/or mineral wool and/or Teflon. This in particular allows a high level of efficiency to be achieved. In particular structural units arranged in the intermediate space can be supported in a protected manner.

The cooking utensil could in particular comprise at least one sensor, which could be provided to detect at least one movement component, in particular at least one torque and/or at least one acceleration moment and/or a rotational moment and/or a rotation speed, of the food processing unit. The sensor could be provided for example to transmit at least one sensor variable, which in particular characterizes the movement component of the food processing unit, to the cooktop control unit. In particular the sensor could be provided to detect the movement component of the food processing unit optically and it could be configured for example as a photocell. Alternatively or additionally the sensor could be provided to detect the movement component of the food processing unit by means of a magnetic field, which could originate in particular from the magnetic element. In particular the cooktop control unit could be provided to determine a change in a movement component of a food to be processed as a function of the sensor variable and in particular to perform at least one automatic processing operation and/or at least one automatic cooking operation. Alternatively or additionally the sensor could be provided to detect a temperature and/or a pH value and/or a weight and/or cooking state, for example boiling and/or simmering and/or slow simmering and/or boiling over, of a food arranged in the food chamber. The sensor could be for example an infrared sensor and/or a resistance sensor, for example an NTC resistor and/or a PTC resistor, and/or an acoustic sensor, for example a microphone, and/or a pressure sensor and/or a weight sensor for detecting a weight of food arranged in the food chamber and/or a volume sensor for detecting a volume of food arranged in the food chamber.

In a further configuration a cooking system with at least one inventive cooking utensil and with at least one cooktop apparatus, in particular an induction cooktop apparatus, is proposed, having at least one induction unit, which is provided at least to supply energy for the receiving unit of the cooking utensil. A "cooktop apparatus" refers particular to at least a part, in particular a subassembly, of a cooktop, in particular of an induction cooktop. In particular the cooktop apparatus can also comprise the entire cooktop, in particular the entire induction cooktop. An "induction unit" refers in particular to a unit which is provided to supply at least one electromagnetic alternating field for an energy transfer in at least one operating state. The induction unit is provided in particular to generate and/or produce at least one induction current in the receiving unit of the cooking utensil by means of the electromagnetic alternating field in at least one operating state. The cooktop apparatus in particular has at least one cooktop operating unit, which is provided at least for the inputting of at least one processing parameter, in particular a rotation speed and/or a processing start time and/or a processing end time and/or a processing period, of the food processing unit. The cooktop operating unit is provided particular to supply and/or display to an operator at least two, in particular at least three, advantageously at least four and preferably at least five processing parameters for selection. In particular the cooktop apparatus has at least one cooktop control unit, which is provided to activate at least the electronics unit and/or drive unit. In particular the cooktop control unit is provided to control and/or regulate the processing parameter of the food processing unit, in particular by activating the electronics unit and/or drive unit. The cooktop control unit is provided in particular to activate the electronics unit and/or drive unit as a function of an operating input by means of a cooktop operating unit. This in particular allows a high level of convenience to be achieved.

It is further proposed that the induction unit has at least one energy transfer element that is configured differently from an induction heating element and is provided to supply the energy for the receiving unit in at least one operating state. In particular the energy transfer element has at least one inductor and/or at least one coil. The energy transfer element is provided in particular to supply the energy for the receiving unit at least by means of an inductive energy transfer in at least one operating state. This in particular allows a large quantity of power to be supplied, in particular compared with the use of a permanent magnet.

It is also proposed that the induction unit has at least one induction heating element, which is provided to supply the energy for the receiving unit in at least one operating state. In particular the induction heating element is provided to heat at least a part of the cooking utensil, in particular at least a part of the interior housing part of the cooking utensil, in particular in addition to supplying energy for the receiving unit, in at least one operating state. An "induction heating element" in this context refers in particular to an element which is provided to generate an electromagnetic alternating field in particular with a frequency between 20 kHz and 100 kHz, which is provided in particular to be converted to heat in an in particular metallic, preferably ferromagnetic, cooking utensil base positioned thereon by eddy current induction and/or magnetic reversal effects. This in particular allows a high level of flexibility to be achieved in particular in respect of the position of the cooking utensil and/or in respect of the tasks of the induction heating element. In particular there is no need for additional structural units in particular in the shape of at least one energy transfer element and/or at least one additional induction heating element, thereby advantageously allowing a compact configuration and/or low costs to be achieved.

The cooking utensil and the cooking system here should not be restricted to the application and embodiment described above. In particular the cooking utensil and cooking system can have a number of individual elements, components and units that is different from the number cited herein to satisfy a mode of operation described herein.

Further advantages will emerge from the description of the drawing which follows. The drawing shows exemplary embodiments of the invention. The drawing, description and claims contain numerous features in combination. The person skilled in the art will expediently also consider the features individually and combine them in useful further combinations.

DETAILED DESCRIPTION OF EXEMPLARY EMBODIMENTS OF THE PRESENT INVENTION

Figure 1:
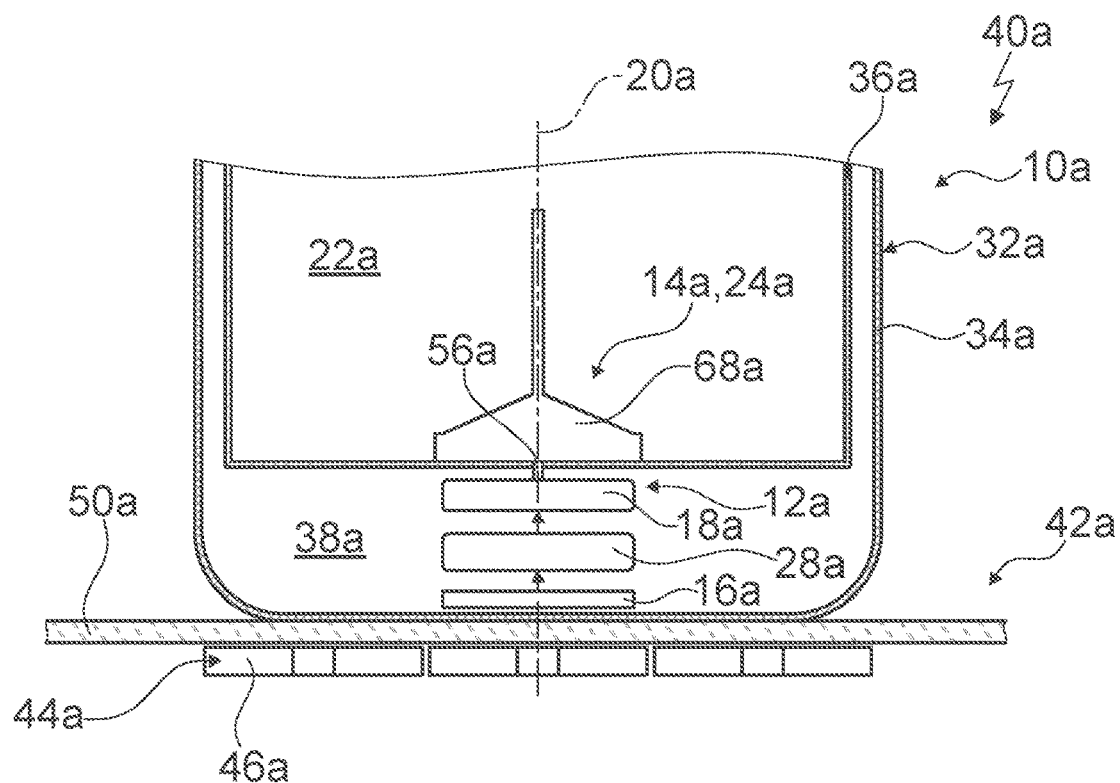
FIG. 1 shows a schematic sectional diagram of a cooking system with a cooking utensil and with a cooktop apparatus.

FIG. 1 shows a cooking system 40a, which is configured as an induction cooking system, with a cooking utensil 10a and with a cooktop apparatus 42a, which is configured as an induction cooktop apparatus. The cooktop apparatus 42a comprises a cooktop plate 50a. In an assembled state the cooktop plate 50a forms a part of a cooktop exterior housing. The cooktop plate 50a is provided to allow a cooking utensil 10a to be positioned thereon.

The cooking utensil 10a has a cooking utensil housing unit 32a. The cooking utensil housing unit 32a defines a food chamber 22a. The cooking utensil housing unit 32a of the cooking utensil 10a has an exterior housing part 34a facing away from the food chamber 22a. The cooking utensil housing unit 32a of the cooking utensil 10a has an interior housing part 36a facing the food chamber 22a.

The exterior housing part 34a and the interior housing part 36a are made of materials with different magnetic properties. The exterior housing part 34a is made largely of a non-metal. The interior housing part 36a is made largely of a ferromagnetic metal.

The exterior housing part 34a and the interior housing part 36a define an intermediate space 38a. The cooking utensil 10a has an insulating material (not shown). The intermediate space 38a is largely filled with the insulating material.

The cooking utensil 10a has a consumer 14a. In an assembled state the consumer 14a is arranged within the food chamber 22a. The consumer 14a is configured as a food processing unit 24a. The food processing unit 24a has a processing tool 68a. The processing tool 68a is provided to process food arranged in the food chamber 22a. In the assembled state the processing tool 68a is arranged in the food chamber 22a. In the assembled state the consumer 14a is arranged in proximity to a base of the interior housing part 36a.

The cooking utensil 10a has a drive unit 12a. In an operating state the drive unit 12a drives the consumer 14a of the cooking utensil 10a. In the assembled state the drive unit 12a is arranged within the cooking utensil housing unit 32a. The drive unit 12a is arranged in the intermediate space 38a in the assembled state. In the assembled state the drive unit 12a is arranged in proximity to the base of the interior housing part 36a. In the assembled state the drive unit 12a and the consumer 14a are separated from one another by the base of the interior housing part 36a.

In the assembled state a receiving unit 16a of the cooking utensil 10a is arranged in the intermediate space 38a in addition to the drive unit 12a. The cooking utensil 10a has the receiving unit 16a. The receiving unit 16a is provided to receive energy in a contactless manner. In the assembled state the receiving unit 16a is arranged in proximity to a base of the exterior housing part 34a.

The receiving unit 16a has an inductor. In the operating state the receiving unit 16a is provided to be magnetized by an electromagnetic alternating field. The receiving unit 16a is provided to receive energy transferred by means of inductive energy transfer. In the operating state the receiving unit 16a is provided to supply energy to the drive unit 12a.

In the operating state the drive unit 12a supplies a magnetic field to drive the consumer 14a. The drive unit 12a has an electric motor 18a. In the operating state the drive unit 12a supplies the magnetic field to drive the consumer 14a within the electric motor 18a. The electric motor 18a uses the magnetic field to generate a rotational movement about a rotation axis 20a. In the operating state the electric motor 18a drives the consumer 14a by means of the rotational movement.

The cooking utensil 10a has a shaft 56a. In the assembled state the shaft 56a connects the electric motor 18a and the consumer 14a to one another. In the operating state the shaft 56a transfers the rotational movement generated by the electric motor 18a to the consumer 14a.

In the assembled state the shaft 56a is arranged partially in the intermediate space 38a. The interior housing part 36a has a recess (not shown). In the assembled state the shaft 56a engages through the recess of the interior housing part 36a. A seal is arranged between the shaft 56a and a lateral delimitation of the recess, substantially preventing food arranged in the food chamber 22a passing into the intermediate space 38a.

The cooking utensil 10a has an electronics unit 28a. In the assembled state the electronics unit 28a is arranged within the cooking utensil housing unit 32a. In the assembled state the electronics unit 28a is arranged in the intermediate space 38a. In the operating state the electronics unit 28a is provided to activate the drive unit 12a. In the operating state the electronics unit 28a manages energy supplied by the receiving unit 16a for energy supply purposes. In the operating state the electronics unit 28a regulates an energy supply from the receiving unit 16a to the drive unit 12a.

Figure 2:
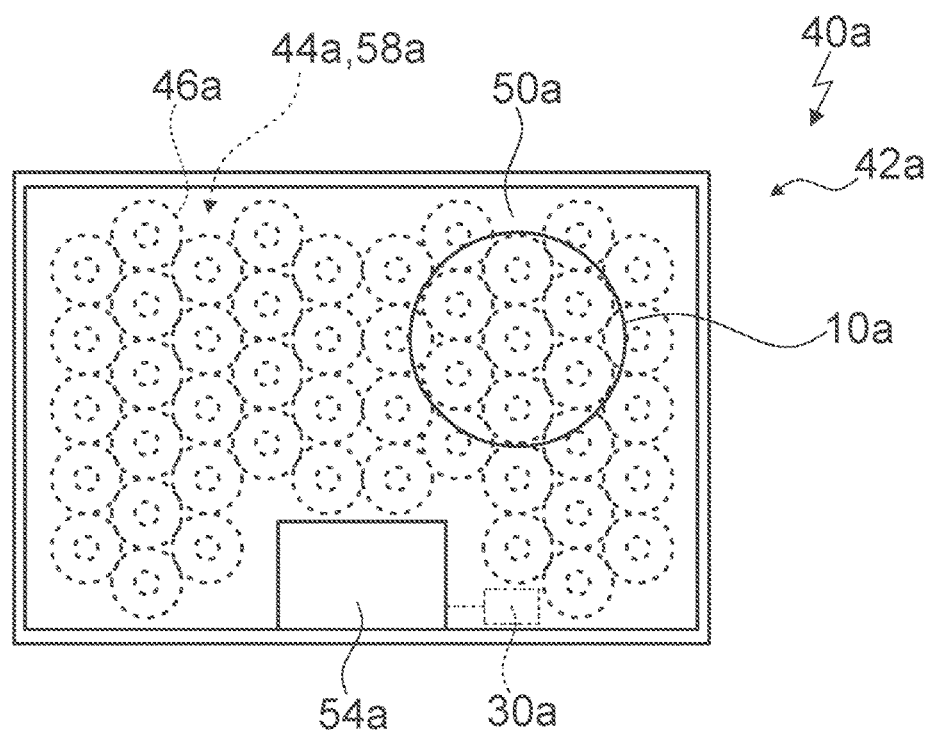
FIG. 2 shows a schematic plan view of the cooking system with the cooktop apparatus and with the cooking utensil.
Figure 3:
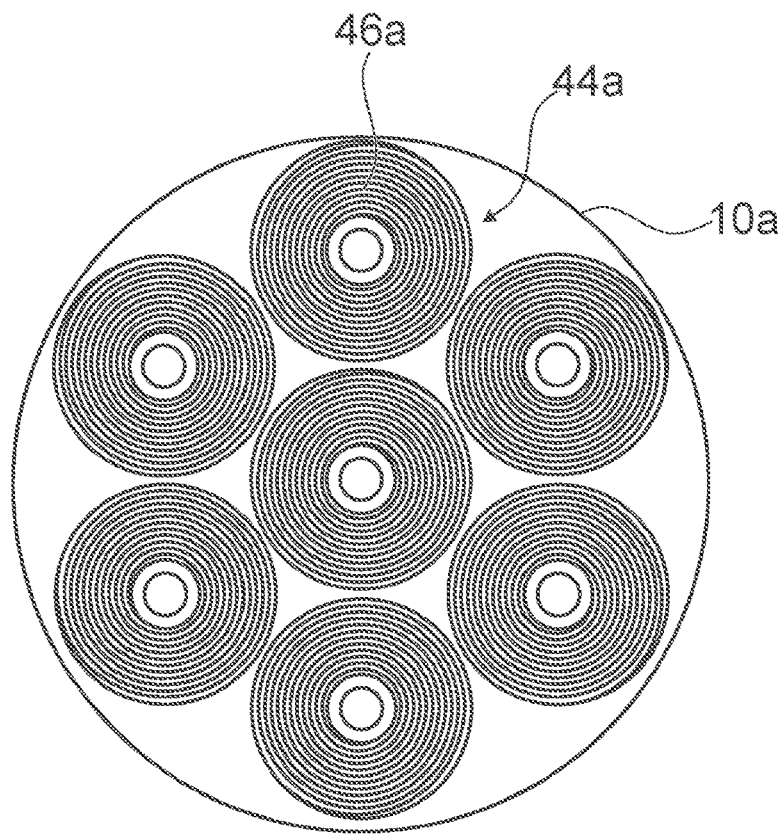
FIG. 3 shows an enlarged detail from FIG. 2.

The cooktop apparatus 42a has an induction unit 44a (see FIGS. 1 to 3). The induction unit 44a is provided to supply energy for the receiving unit 16a of the cooking utensil 10a. In the operating state the induction unit 44a supplies an electromagnetic alternating field to supply energy for the receiving unit 16a. The induction unit 44a supplies the receiving unit 16a with energy by means of inductive energy transfer.

In the present exemplary embodiment the induction unit 44a forms a variable cooking surface region 58a. The induction unit 44a has a number of induction heating elements 46a. Only one of a number of objects present multiple times is shown with a reference character in each of the figures. The induction heating elements 46a are arranged in the form of a matrix. Alternatively the induction heating elements could in particular form a conventional cooktop, which could have in particular fixed heating zones defined by the positions of the induction heating elements and which could in particular be marked on the cooktop plate.

In the present exemplary embodiment the induction unit 44a has forty eight induction heating elements 46a. Only one of the induction heating elements 46a is described in the following. The induction heating element 46a is provided to heat a cooking utensil 10a positioned on the cooktop plate 50a above the induction heating element 46a. In the operating state the induction heating element 46a supplies the energy for the receiving unit 16a.

The cooktop apparatus 42a has a cooktop operating unit 54a for inputting and/or selecting operating parameters, for example a heat output and/or a heat output density and/or a heating zone. The cooktop operating unit 54a is provided to output a value of an operating parameter to an operator.

The cooktop apparatus 42a has the cooktop control unit 30a. The cooktop control unit 30a is provided to execute actions and/or change settings as a function of operating parameters input by means of the cooktop operating unit 54a. The cooktop control unit 30a regulates an energy supply to the induction unit 44a for the performance of a heating operation. The cooking utensil 10a is provided to be positioned on the cooktop plate 50a for the performance of the heating operation.

In the operating state the cooktop control unit 30a sends control commands to the electronics unit 28a of the cooking utensil 10a. In the operating state the electronics unit 28a receives the control commands from the cooktop control unit 30a. In the operating state the electronics unit 28a communicates with the cooktop control unit 30a. In the operating state the electronics unit 28a regulates an energy supply from the receiving unit 16a to the drive unit 12a as a function of the control commands received from the cooktop control unit 30a.

In the present exemplary embodiment the food processing unit 24a is configured as a whisking unit. The food processing unit 24a is provided to mix food arranged within the food chamber 22a.

Figure 4:
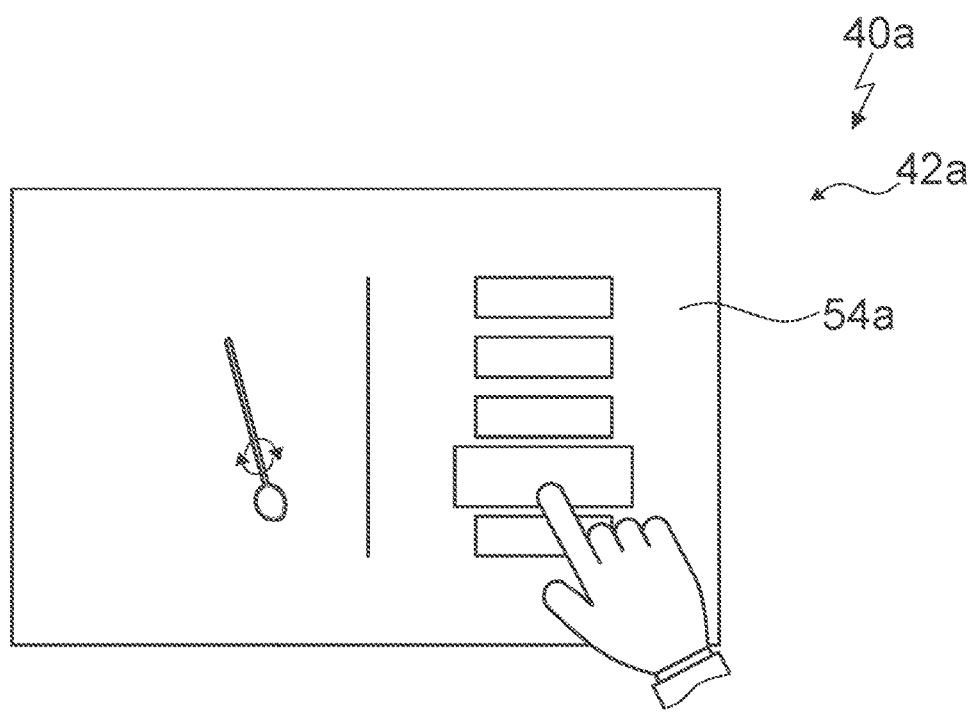
FIG. 4 shows a schematic plan view of a cooktop operating unit of the cooktop apparatus.

The cooktop operating unit 54a is provided for the inputting of a rotation speed of the food processing unit 24a (see FIG. 4). In the present exemplary embodiment the cooktop operating unit 54a has a touch-sensitive operating element for inputting the rotation speed of the food processing unit 24a. The cooktop operating unit 54a has a display unit. The cooktop operating unit 54a provides an operator with a selection of rotation speeds by means of the display unit. The display unit is provided to display a rotation speed selected by an operator in an enlarged manner.

The cooktop control unit could activate the drive unit to control the rotation speed of the food processing unit for example as a function of an operating input by means of the cooktop operating unit. Alternatively the cooktop control unit could in particular transmit at least one control command to the electronics unit, which could be provided in particular to activate the drive unit to control the rotation speed of the food processing unit as a function of the control command.

Further exemplary embodiments of the invention are shown in FIGS. 5 to 8. The descriptions which follow are substantially restricted to the differences between the exemplary embodiments, it being possible to refer to the description of the exemplary embodiments in FIGS. 1 to 4 for parts, features and functions that remain the same. To distinguish between the exemplary embodiments the letter a in the reference characters of the exemplary embodiments in FIGS. 1 to 4 is replaced by the letters b to d in the reference characters of the exemplary embodiments in FIGS. 5 to 8. Reference can also be made in principle to the drawings and/or description of the exemplary embodiments in FIGS. 1 to 4 for parts with the same designation, in particular for parts with the same reference characters.

Figure 5:
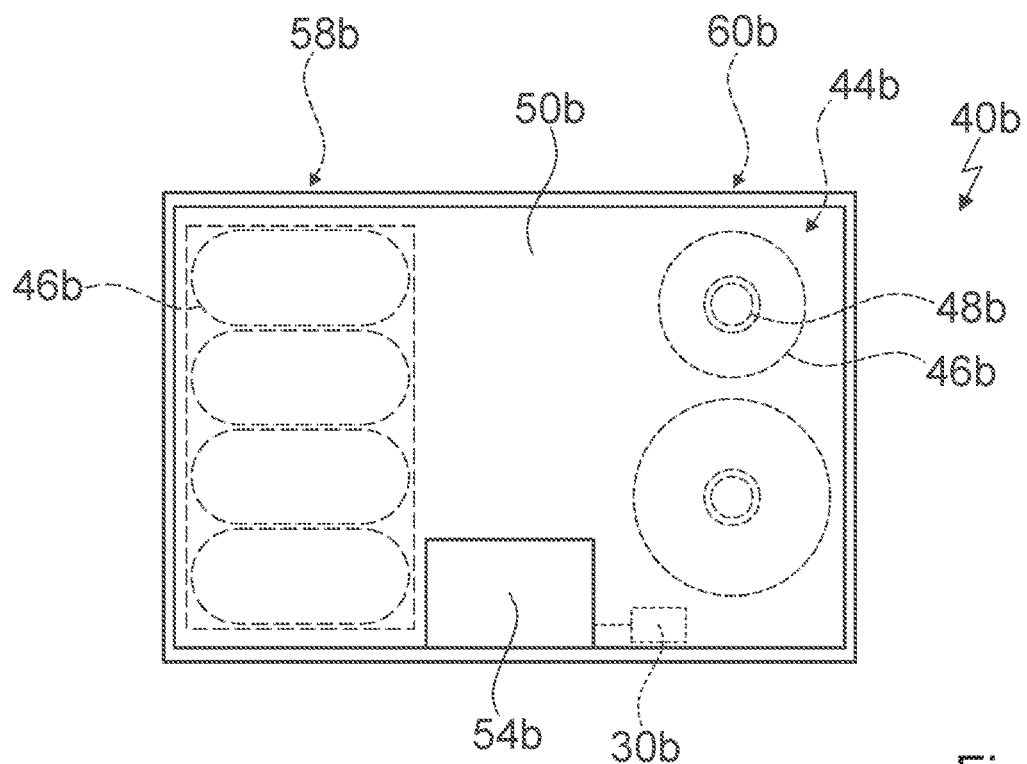
FIG. 5 shows a schematic plan view of an alternative cooking system with an alternative cooktop apparatus and with a cooking utensil.
Figure 6:
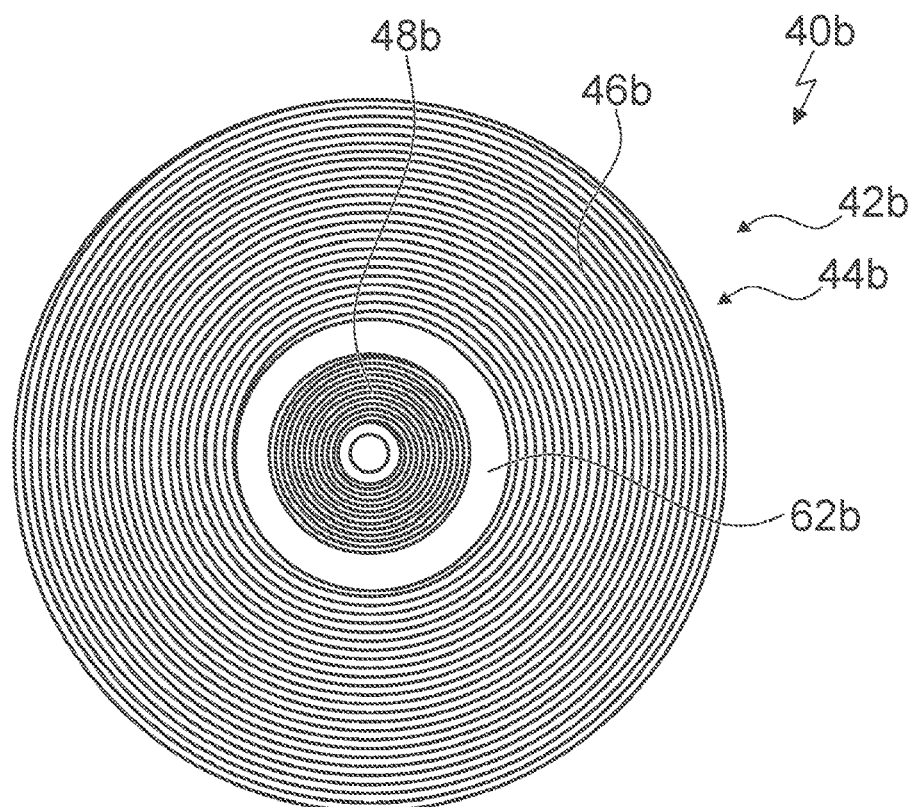
FIG. 6 shows an enlarged detail from FIG. 5.

FIG. 5 shows an alternative cooking system 40b with an alternative cooktop apparatus 42b. The cooktop apparatus 42b has a number of induction heating elements 46b. Some of the induction heating elements 46b define a variable cooking surface region 58b. In an operating state the variable cooking surface region 58a is provided to heat a cooking utensil 10b positioned on a cooktop plate 50b above the variable cooking surface region 58b.

Some of the induction heating elements 46b form a conventional cooktop 60b. The variable cooking surface region 58b and the conventional cooktop 60b are arranged next to one another. The induction heating elements 46b of the variable cooking surface region 58b and the induction heating elements 46b of the conventional cooktop 60b are configured differently. The induction heating elements 46b of the conventional cooktop 60b have a substantially round shape. The induction heating elements 46b of the variable cooking surface region 58b have a substantially oval shape.

One of the induction heating elements 46b of the conventional cooktop 60b is described by way of example in the following. The induction heating elements 46b of the variable cooking surface regions 58b could be configured in a similar manner.

An induction unit 44b of the cooktop apparatus 42b has a number of energy transfer elements 48b. Only one of the energy transfer elements 48b is described in the following.

The energy transfer element 48b is configured differently from the induction heating element 46b. The induction unit 44b has a number of coil supports 62b. The induction unit 44b has one coil support 62b for each induction heating element 46b. Only one of the coil supports 62b is described in the following.

The induction heating element 46b and the energy transfer element 48b are mounted on the same coil support 62b. The induction heating element 46b is arranged concentrically around the energy transfer element 48b. In the operating state the energy transfer element 48b supplies the energy for a receiving unit 16b of a cooking utensil 10b.

Figure 7:
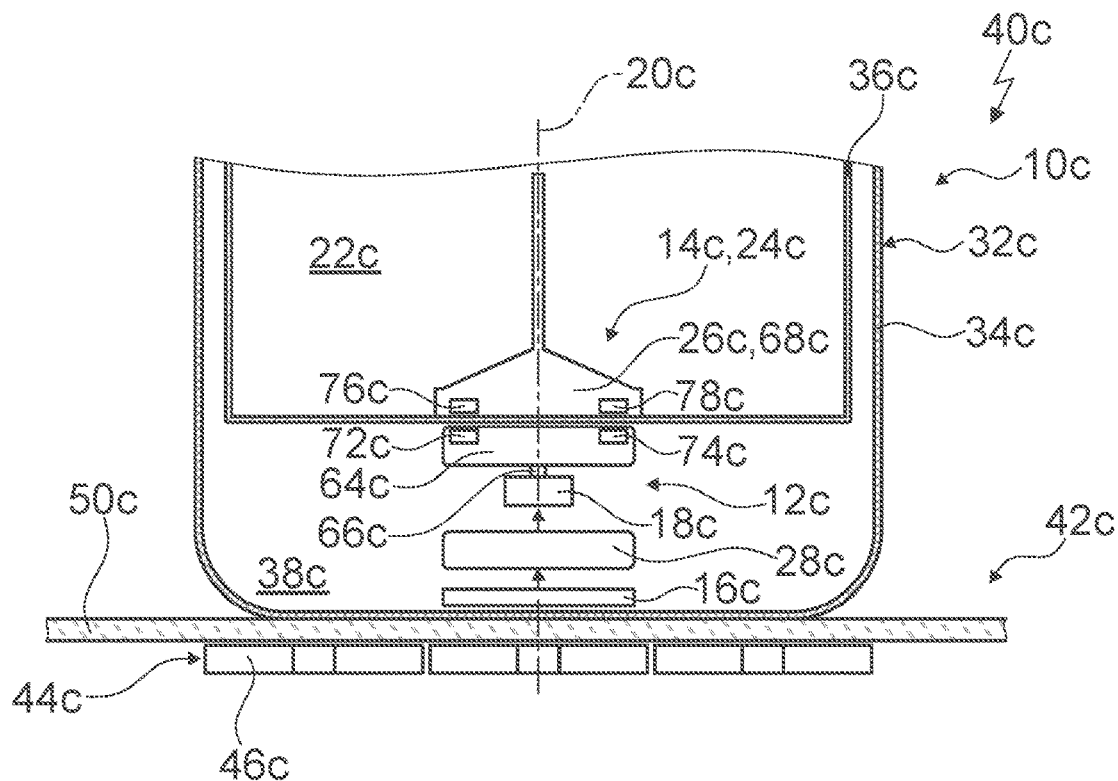
FIG. 7 shows a schematic sectional diagram of an alternative cooking system with a cooktop apparatus and with a cooking utensil and FIG. 8 shows a schematic sectional diagram of an alternative cooking system with a cooktop apparatus and with a cooking utensil.

FIG. 7 shows an alternative cooking system 40c, with an alternative cooktop apparatus 42c. In an operating state a drive unit 12c of the cooktop apparatus 42c drives a consumer 14c. In the operating state the drive unit 12c supplies a magnetic field to drive the consumer 14c. The drive unit 12c has an electric motor 18c. The electric motor 18c is provided to drive the consumer 14c.

In the present exemplary embodiment the drive unit 12c has a permanent magnet 64c. In the assembled state the permanent magnet 64c is supported in such a manner that it can rotate about a rotation axis 20c. The drive unit 14 has a transfer element 66c. In the assembled state the transfer element 66c connects the electric motor 18c and the permanent magnet 64c to one another. The transfer element 66c is configured as a shaft.

The electric motor 18c is provided to drive the permanent magnet 64c. In the operating state the transfer element 66c transfers a rotational movement supplied by the electric motor 18c to the permanent magnet 64c. In the operating state the permanent magnet 64c generates the magnetic field to drive the consumer 14c.

The drive unit 12c supplies a magnetic field that rotates substantially about a rotation axis 20c to drive the consumer 14c. In the operating state the magnetic field supplied by the drive unit 12c engages partially in a food chamber 22c of a cooking utensil 10c. The drive unit 12c supplies the magnetic field to drive the consumer 14c by means of the rotational movement of the permanent magnet 64c.

The consumer 14c has a magnetic element 26c. The magnetic element 26c is configured as a single piece with a processing tool 68c of a food processing unit 24c. In the operating state the magnetic element 26c interacts with the magnetic field supplied by the drive unit 12c.

The magnetic element 26c and the permanent magnet 64c are configured to correspond to one another. In the operating state the magnetic element 26c and the permanent magnet 64c interact with one another. The permanent magnet 64c has at least one first magnetic pole 72c and one at least second magnetic pole 74c. The magnetic element 26c has one at least first magnetic pole 76c and one at least second magnetic pole 78c. For example the permanent magnet and the magnetic element could have a number of first magnetic poles and a number of second magnetic poles, in particular in a first instance.

In a first instance the magnetic poles 72c, 74c of the permanent magnet 64c could in particular be configured substantially identically to one another. The magnetic poles 76c, 78c of the magnetic element 26c could in particular be configured substantially identically to one another. For example the magnetic poles 72c, 74c of the permanent magnet 64c could be arranged facing the cooktop plate 50c in the installed position. The magnetic poles 76c, 78c of the magnetic element 26c could for example be arranged facing the cooktop plate 50c in the installed position. For example the magnetic poles 72c, 74c of the permanent magnet 64c could be configured as south poles and the magnetic poles 76c, 78c of the magnetic element 26c as north poles. Alternatively the magnetic poles 72c, 74c of the permanent magnet 64c could be configured as north poles and the magnetic poles 76c, 78c of the magnetic element 26c as south poles.

In a second instance the magnetic poles 72c, 74c of the permanent magnet 64c could in particular be configured differently. The first magnetic pole 72c of the permanent magnet 64c could be configured as a north pole and the second magnetic pole 74c of the permanent magnet 64c could be configured as a south pole. The magnetic poles 76c, 78c of the magnetic element 26c could in particular be configured differently. The first magnetic pole 76c of the magnetic element 26c could be configured as a south pole and the second magnetic pole 78c of the magnetic element 26c could be configured as a north pole.

Figure 8:
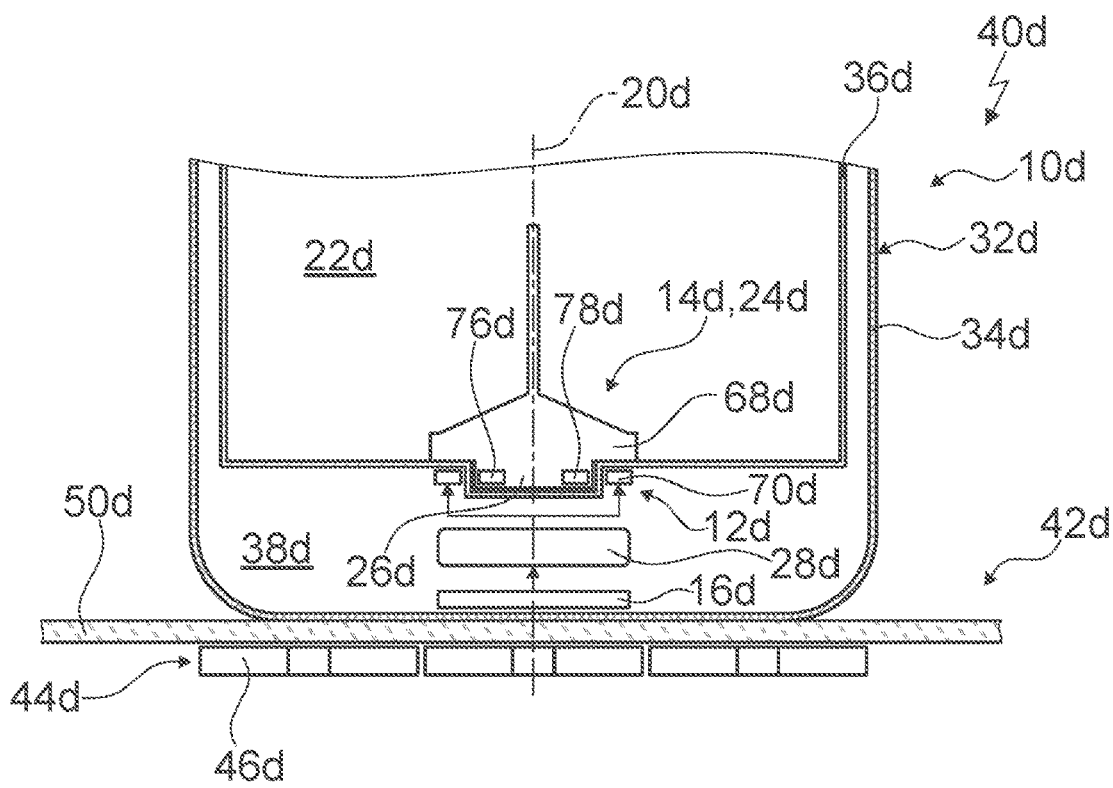

FIG. 8 shows an alternative cooking system 40d, with an alternative cooktop apparatus 42d. In an operating state a drive unit 12d of the cooktop apparatus 42d drives a consumer 14d. In the operating state the drive unit 12d supplies a magnetic field to drive the consumer 14d.

In an operating state the drive unit 12d supplies a magnetic field that rotates substantially about a rotation axis 20d to drive the consumer 14d. In the operating state the magnetic field supplied by the drive unit 12d engages partially in a food chamber 22d of a cooking utensil 10d.

In the present exemplary embodiment the drive unit 12d has at least two electromagnets 70d. The drive unit 12d has a number of electromagnets 70d. It is assumed in the following that the drive unit 12d has a number n of electromagnets 70d.

In an assembled state the electromagnets 70d are arranged around the rotation axis 20d. In the assembled state the electromagnets 70d are arranged in a regular manner and substantially in one plane around the rotation axis 20d. The electromagnets 70d are arranged around the rotation axis 20d at an angle of substantially 360°/n from the rotation axis 20d in the plane.

In an operating state an electronics unit 28d of the cooking utensil 10d is provided to activate the electromagnets 70d as a function of control commands transmitted by a cooktop control unit 30d. In the operating state the electronics unit 28d operates the electromagnets 70d. In the operating state the electronics unit 28d activates the electromagnets 70d by means of pulse width modulation. The electronics unit 28d activates the electromagnets 70d with signals with a phase offset of substantially 360°/n. The electromagnets 70d supply the magnetic field rotating substantially about the rotation axis 20d as a function of activation by the electronics unit 28d to drive the consumer 14d.

The drive unit 12d is free of moving parts. In the operating state the drive unit 12d drives the magnetic element 26d of the consumer 14d. In the present exemplary embodiment the magnetic element 26d has a first magnetic pole 76d and a second magnetic pole 78d. The first magnetic pole 76d is configured as a south pole. The second magnetic pole 78d is configured as a north pole.

The invention claimed is:

1. A cooking utensil, comprising:
a drive unit configured to rotate at least one consumer;
at least one sensor configured to detect, based on a movement of the at least one consumer, a property of the movement of the at least one consumer, and to transmit a signal corresponding to the detected property to a control unit of a cooktop;
an electronics unit configured to receive from the control unit a control command based on the detected property and to control the drive unit based on the control command; and
a receiving unit configured to receive energy in a contactless manner and to supply energy to the drive unit;
wherein the consumer is disposed in a food chamber defined by an interior housing of the cooking utensil and the drive unit is disposed proximate a base of the food chamber in an intermediate space defined between an exterior housing and the interior housing of the cooking utensil;
wherein the intermediate space is larger than the drive unit, such that at least a portion of the intermediate space is unoccupied by the drive unit; and
wherein the drive unit is free of moving parts and comprises a plurality of electromagnets;
wherein the at least one sensor is configured to optically detect the property of the movement of the at least one consumer.

2. The cooking utensil of claim 1, wherein the receiving unit includes at least one inductor.

3. The cooking utensil of claim 1, wherein the drive unit is configured to supply at least one magnetic field to drive the consumer.

4. The cooking utensil of claim 1, wherein the drive unit is configured to supply a magnetic field that rotates at least substantially about at least one rotation axis and engages at least partially in the food chamber to drive the consumer.

5. The cooking utensil of claim 1, wherein the consumer is configured as a food processing unit.

6. The cooking utensil of claim 3, wherein the consumer has at least one magnetic element configured to interact with the magnetic field.

7. The cooking utensil of claim 1, wherein the receiving unit is arranged within the intermediate space of the cooking utensil.

8. The cooking utensil of claim 7, wherein the exterior housing faces away from the food chamber and is made of a material having a magnetic property, and the interior housing faces the food chamber and is made of a material having a magnetic property which is different than the magnetic property of the material of the exterior housing.

9. The cooking utensil of claim 8, further comprising an insulating material to at least largely fill the portion of the intermediate space unoccupied by the drive unit and the receiving unit.

10. A cooking system, comprising: at least one cooking utensil including: a drive unit configured to rotate at least one consumer, a receiving unit configured to receive energy in a contactless manner and to supply energy to the drive unit, an electronics unit, and at least one sensor configured to optically detect a property of a movement of the at least one consumer, wherein the consumer is disposed in a food chamber defined by an interior housing of the cooking utensil and the drive unit is disposed proximate a base of the food chamber in an intermediate space defined between an exterior housing and the interior housing of the cooking utensil; and at least one cooktop apparatus including a control unit, and at least one induction unit having an energy transfer element configured to supply energy to the receiving unit of the cooking utensil and a heating element configured to supply heating energy to the cooking utensil; wherein the at least one sensor is configured to transmit a signal corresponding to the detected property of the at least one consumer to the control unit of the cooktop apparatus, and the electronics unit is configured to receive from the control unit a control command based on the detected property and to control the drive unit based on the control command; and wherein the intermediate space is larger than the drive unit, such that at least a portion of the intermediate space is unoccupied by the drive unit.

11. The cooking system of claim 10, wherein the receiving unit of the cooking utensil includes at least one inductor.

12. The cooking system of claim 10, wherein the drive unit is configured to supply at least one magnetic field to drive the consumer.

13. The cooking system of claim 10, wherein the drive unit includes at least one electric motor configured to drive the consumer.

14. The cooking system of claim 10, wherein the drive unit is configured to supply a magnetic field that rotates at least substantially about at least one rotation axis and engages at least partially in the food chamber to drive the consumer.

15. The cooking system of claim 10, wherein the consumer is configured as a food processing unit.

16. The cooking system of claim 12, wherein the consumer has at least one magnetic element configured to interact with the magnetic field.

17. The cooking system of claim 10, wherein the receiving unit is arranged within the intermediate space of the cooking utensil.

18. The cooking system of claim 17, wherein the exterior housing faces away from the food chamber and is made of a material having a magnetic property, and the interior housing faces the food chamber and is made of a material having a magnetic property which is different than the magnetic property of the material of the exterior housing.

19. The cooking system of claim 18, further comprising an insulating material to at least largely fill the portion of the intermediate space unoccupied by the drive unit and the receiving unit.

20. The cooking utensil of claim 5, wherein the food processing unit includes a processing tool configured to mix a food arranged in the food chamber.

21. The cooking utensil of claim 1, wherein the property of the movement is a rotational speed of the at least one consumer.

22. The cooking utensil of claim 1, wherein the at least one sensor is configured to detect the property of the movement based on a magnetic field of the at least one consumer.

* * * * *